United States Patent
Smith et al.

(10) Patent No.: US 9,394,954 B2
(45) Date of Patent: Jul. 19, 2016

(54) GUIDE PIN FOR DISC BRAKE ASSEMBLY AND DISC BRAKE ASSEMBLY INCLUDING SUCH A GUIDE PIN

(71) Applicants: Kelsey-Hayes Company, Livonia, MI (US); Lucas Automotive GmbH, Koblenz (DE)

(72) Inventors: Daniel Smith, Livonia, MI (US); Kraig Gerber, Plymourth, MI (US); Eduardo Morais, South Lyons, MI (US); Marco Becker, Oberdurenbach (DE); Florian Roessinger, Neuwied (DE); Christian Schroeter, Sinzig (DE); Guido ZenZen, Macken (DE)

(73) Assignees: Kelsey-Hayes Company, Livonia, MI (US); Lucas Automotive GmbH, Koblenz (DE)

( * ) Notice: Subject to any disclaimer, the term of this patent is extended or adjusted under 35 U.S.C. 154(b) by 64 days.

(21) Appl. No.: 13/833,416

(22) Filed: Mar. 15, 2013

(65) Prior Publication Data

US 2014/0262637 A1   Sep. 18, 2014

(51) Int. Cl.
*F16D 65/14* (2006.01)
*F16D 65/00* (2006.01)
*F16D 55/2265* (2006.01)

(52) U.S. Cl.
CPC ...... *F16D 65/0087* (2013.01); *F16D 55/22655* (2013.01)

(58) Field of Classification Search
CPC ............... F16D 2055/0004; F16D 2055/0008; F16D 2055/007; F16D 55/2265; F16D 55/22655; F16D 55/227; F16D 65/0087
USPC ........... 188/73.1, 73.43, 73.44, 73.45, 205 R, 188/206 R; 411/386, 403
See application file for complete search history.

(56) References Cited

U.S. PATENT DOCUMENTS

| | | | | |
|---|---|---|---|---|
| 3,744,367 | A * | 7/1973 | Lerich | 411/75 |
| 4,313,526 | A * | 2/1982 | Farr | 188/72.4 |
| 4,458,790 | A * | 7/1984 | Hoffman et al. | 188/71.8 |
| 5,526,904 | A * | 6/1996 | Walden et al. | 188/73.45 |
| 5,927,446 | A | 7/1999 | Evans | |
| 6,039,156 | A | 3/2000 | Schneider | |
| 8,051,958 | B1 | 11/2011 | Rockwell et al. | |
| 2006/0049008 | A1 * | 3/2006 | Kinoshita et al. | 188/73.39 |

* cited by examiner

*Primary Examiner* — Melody Burch
(74) *Attorney, Agent, or Firm* — MacMillan, Sobanski & Todd, LLC

(57) ABSTRACT

A disc brake assembly having a guide pin disposed in a bore of an anchor bracket such that a guide pin axis is offset relative to a bore axis whereby there is provided at least one defined point of contact between only a portion of the guide pin and a portion of an inner surface of the bore. The guide pin includes a groove formed therein, the groove defines a groove axis which is offset relative to the guide pin axis, and a resilient member is disposed in the groove which is operative to bias the guide pin in the bore such that the guide pin axis is offset relative to bore axis to provide the at least one defined point of contact between only a portion of the guide pin and a portion of the inner surface of the bore.

16 Claims, 4 Drawing Sheets

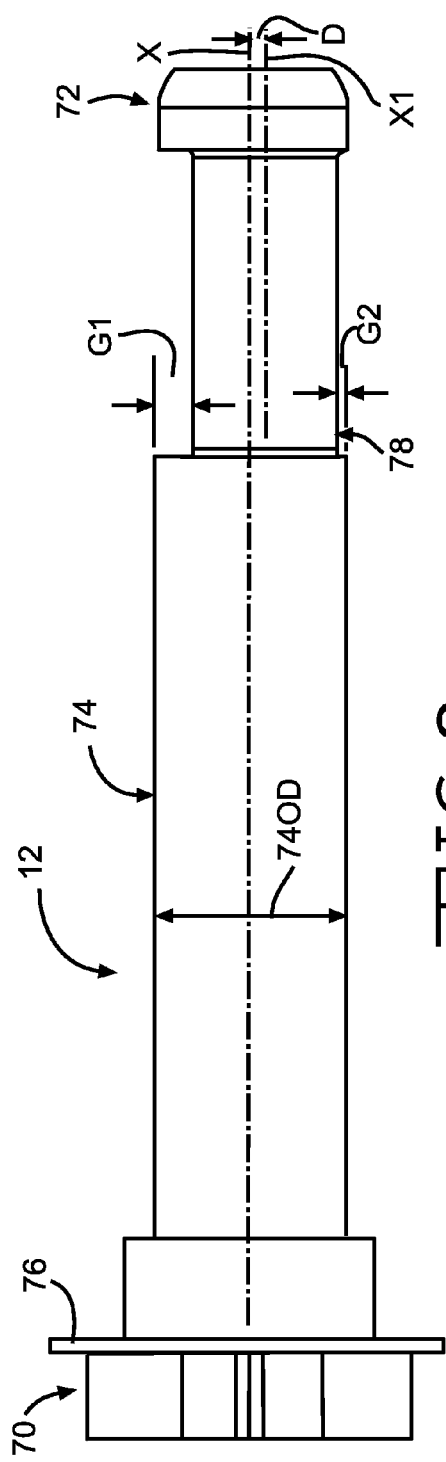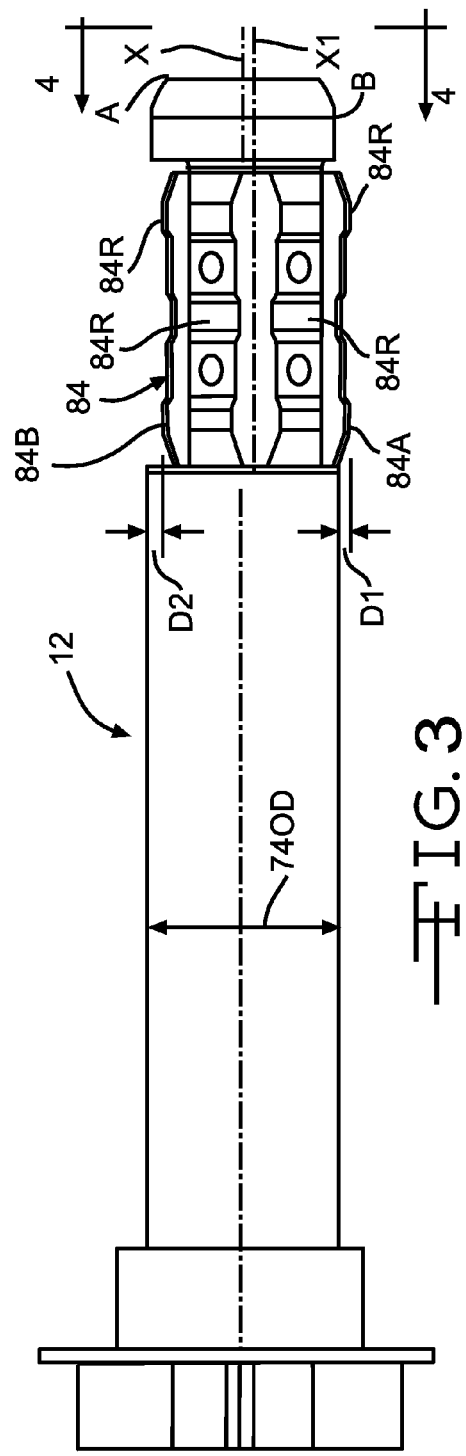

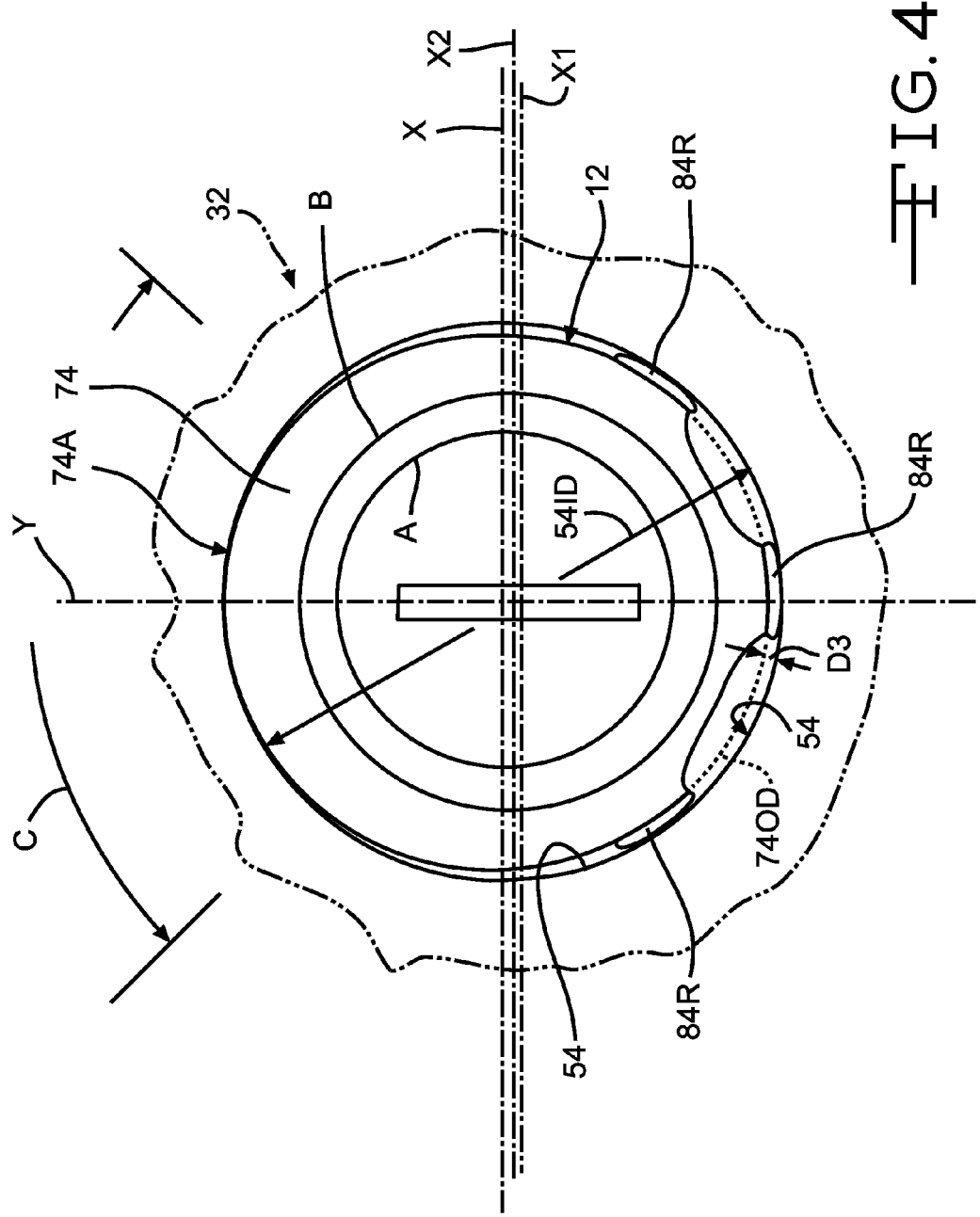

GUIDE PIN FOR DISC BRAKE ASSEMBLY AND DISC BRAKE ASSEMBLY INCLUDING SUCH A GUIDE PIN

BACKGROUND OF THE INVENTION

This invention relates in general to vehicle brake assemblies and in particular to an improved structure for a guide pin for a vehicle disc brake assembly and a disc brake assembly including such a guide pin.

Most vehicles today are equipped with a brake system for retarding or stopping movement of the vehicle in a controlled manner. A typical brake system for an automobile or truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefore are well known in the art.

A typical disc brake assembly includes an anchor bracket which is secured to a fixed, non-rotatable component of the vehicle. A pair of brake shoes are supported on the anchor bracket for sliding movement relative thereto. The brake shoes have respective friction pads which are disposed on opposite sides of a brake disc. The disc, in turn, is connected to the wheel of the vehicle for rotation therewith. To effect braking action, the brake shoes are moved inwardly toward one another so as to frictionally engage the opposed sides of the disc. Such frictional engagement causes retarding or stopping of the rotational movement of the disc and, therefore, the wheel of the vehicle in a controlled manner.

To accomplish this, the disc brake assembly further includes a caliper assembly for selectively moving the brake shoes into frictional engagement with the brake disc. The caliper assembly typically includes guide pins or other components to slidably support a caliper housing relative to the fixed anchor bracket. The caliper housing is generally C-shaped, having an inboard leg disposed adjacent the inboard brake shoe and an outboard leg disposed adjacent to the outboard brake shoe. One or more hydraulically or pneumatically actuated pistons are provided in respective cylindrical recesses formed in the caliper inboard leg adjacent to the inboard brake shoe. When the brake pedal is depressed, the piston and the inboard leg of the caliper are urged apart from one another. Specifically, the piston is urged outwardly, while the outboard leg of the caliper is urged inwardly. As mentioned above, the piston is disposed adjacent to the inboard brake shoe and, therefore, urges it outwardly toward the inner side of the disc. Because the caliper is slidably mounted on the pins of the anchor bracket, the caliper outboard leg (and, thus, the outboard brake shoe disposed adjacent thereto) are urged inwardly toward the outer side of the disc. As result, the brake shoes frictionally engage the opposed sides of the disc.

SUMMARY OF THE INVENTION

This invention relates to an improved structure for a guide pin for a vehicle disc brake assembly and a disc brake assembly including such a guide pin.

According to one embodiment, the disc brake assembly may comprise, individually and/or in combination, one or more of the following features: an anchor bracket having at least one bore formed therein, the bore defining a first axis; and a guide pin adapted to be disposed in the at least one bore of the anchor bracket and configured to slidably support a brake caliper relative to the anchor bracket, the guide pin defining a second axis; wherein the guide pin includes at least one groove formed therein, the groove defining a third axis which is offset relative to the second axis of the guide pin, the at least one groove having a member disposed therein which is operative to bias the guide pin in the at least one bore whereby the second axis of the guide pin is offset relative to the first axis of the at least one bore such that there is provided at least one defined point of contact between only a portion of the guide pin and a portion of an inner surface of the at least one bore.

According to this embodiment, the member is a resilient member.

According to this embodiment, the member is an annular rubber bushing.

According to this embodiment, the guide pin includes a first end, a shank portion and an opposite second end, wherein the groove is formed at least in the shank portion.

According to this embodiment, the first end includes an indicia indicating means.

According to this embodiment, the at least bore defines an inner diameter and the shank portion of the guide pin defines an outer diameter which is less than the inner diameter of the at least one bore.

According to this embodiment, the at least one point of contact extends less than 180 degrees.

According to this embodiment, the first axis of the bore is located between the second axis of the guide pin and the third axis of the groove.

According to this embodiment, the member is a resilient member and includes a plurality of raised ribs, wherein only at least one of the plurality of raised ribs engage a portion of an inner diameter surface of the at least one bore and are compressed.

According to another embodiment, the disc brake assembly may comprise, individually and/or in combination, one or more of the following features: an anchor bracket having a bore formed therein, the bore defining a first axis; and a guide pin adapted to be disposed in the at least one bore of the anchor bracket and configured to slidably support a brake caliper relative to the anchor bracket, the guide pin defining a second axis; wherein the guide pin includes a groove formed therein, the groove defining a third axis which is eccentric relative to the second axis of the guide pin, the groove having a member disposed therein which is operative to bias the guide pin in the at least one bore whereby the second axis of the guide pin is eccentric relative to the first axis of the at least one bore such that there is provided at least one defined point of contact between only a portion of the guide pin and a portion of an inner surface of the at least one bore.

According to this embodiment, the member is a resilient member.

According to this embodiment, the member is an annular rubber bushing.

According to this embodiment, the guide pin includes a first end, a shank portion and an opposite second end, wherein the groove is formed at least in the shank portion.

According to this embodiment, the first end includes an indicia indicating means.

According to this embodiment, the bore defines an inner diameter and the shank portion of the guide pin defines an outer diameter which is less than the inner diameter of the bore.

According to this embodiment, the at least one point of contact extends less than 180 degrees.

According to this embodiment, the first axis of the bore is located between the second axis of the guide pin and the third axis of the groove.

According to this embodiment, the member is a resilient member and includes a plurality of raised ribs, wherein only at least one of the plurality of raised ribs engage a portion of an inner diameter surface of the bore and are compressed.

According to another embodiment, a guide pin adapted for use in a disc brake assembly may comprise, individually and/or in combination, one or more of the following features: a guide pin having a groove formed therein, the groove defining a first axis which is eccentric relative to a second axis of the guide pin, the groove having a member disposed therein which is configured to bias the guide pin in a bore of an anchor bracket of the disc brake assembly whereby the second axis of the guide pin is eccentric relative to the first axis of the at least one bore such that there is provided at least one defined point of contact between only a portion of the guide pin and a portion of an inner surface of the at least one bore.

According to this embodiment, the member is an annular rubber bushing, the guide pin includes a first end, a shank portion and an opposite second end, and the groove is formed at least in the shank portion.

Other advantages of this invention will become apparent to those skilled in the art from the following detailed description of the invention, when read in light of the accompanying drawings.

BRIEF DESCRIPTION OF THE DRAWINGS

FIG. 2 is a view of the guide pin shown in FIG. 1, without a bushing installed thereon.

FIG. 3 is a view of the guide pin shown in FIG. 1, with the bushing installed thereon.

FIG. 4 is a schematic view for discussion purposes generally taken in the direction of line 4-4 of FIG. 3, and also showing the guide pin installed in a bore of a component of the vehicle disc brake assembly.

DETAILED DESCRIPTION OF THE PREFERRED EMBODIMENTS

Figure 1:
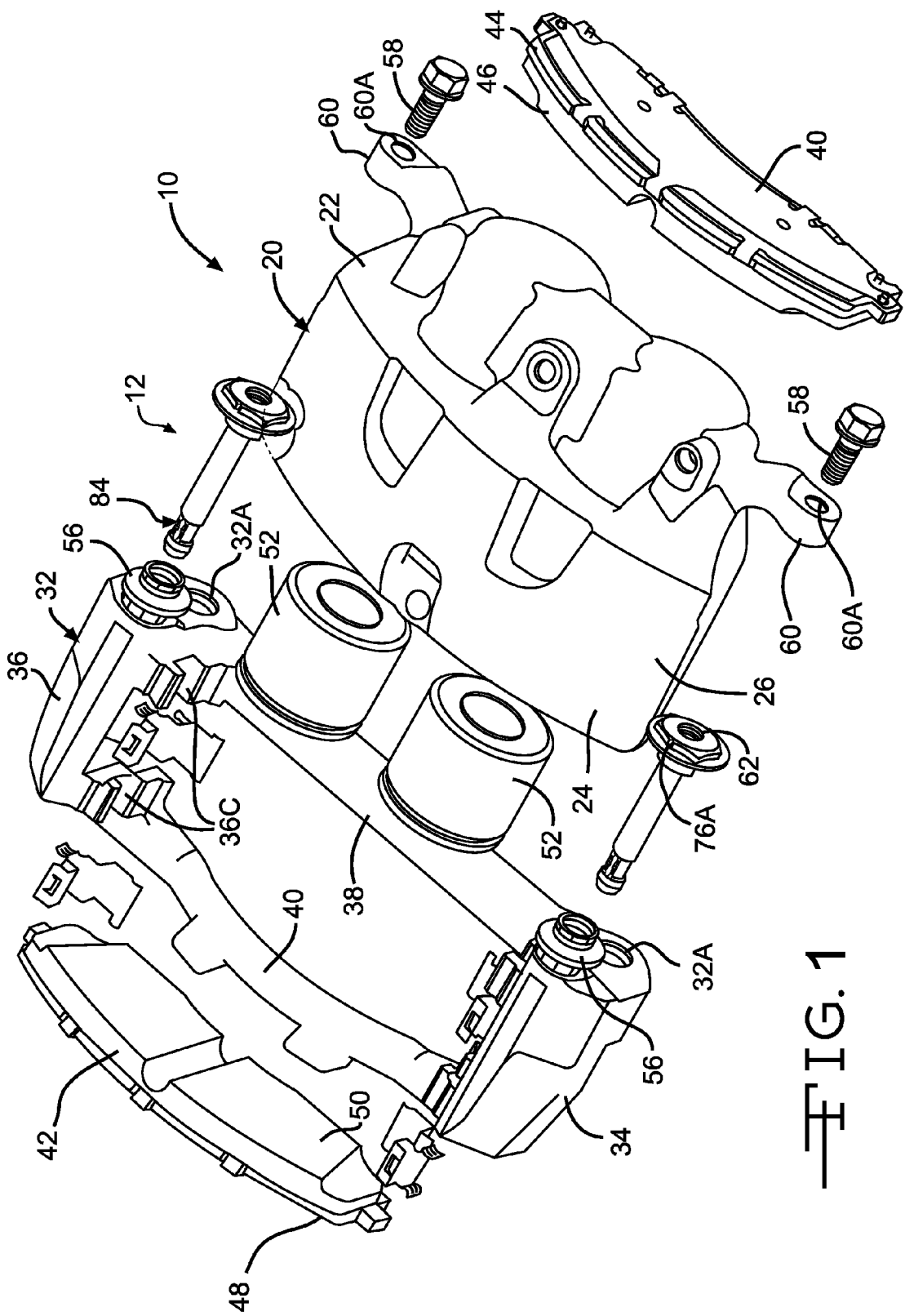
FIG. 1 is an exploded perspective view of a portion of an embodiment of a vehicle disc brake assembly, including a first embodiment of a guide pin, constructed in accordance with the present invention.

Referring now to FIG. 1, there is illustrated a portion of a vehicle disc brake assembly, indicated generally at 10, including an embodiment of a guide pin, indicated generally at 12, in accordance with the present invention. The general structure and operation of the prior art disc brake assembly 10 is conventional in the art. Thus, only those portions of the prior art disc brake assembly 10 which are necessary for a full understanding of this invention will be explained and illustrated. Also, although this invention will be described and illustrated in connection with the particular disc brake assembly 10 disclosed herein, it will be appreciated that this invention may be used in connection with other types or kinds of disc brake assemblies, such as for example, as generally shown in U.S. Pat. No. 8,051,958 to Rockwell et al., U.S. Pat. No. 6,039,156 to Schneider, and U.S. Pat. No. 5,927,446 to Evans, the disclosures of each of these patents incorporated herein by reference in their entirety, and/or in connection with other types of kinds of "pin guided" or "pin sliding" disc brake assemblies, if so desired.

As shown in the illustrated embodiment of FIG. 1, the disc brake assembly 10 is a pin guided or pin sliding type of disc brake assembly and includes a generally C-shaped caliper, indicated generally at 20. The caliper 20 includes an inboard leg portion 22 and an outboard leg portion 24 which are interconnected by an intermediate bridge portion 26. The caliper 20 is slidably supported on a pair of the guide pins 12 which are secured to an anchor bracket, indicated generally at 32. The anchor bracket 32 is, in turn, secured to a stationary component of the vehicle by suitable fasteners, such as for example bolts (not shown), which extend through openings 32A provided in the anchor bracket 32. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

In the illustrated embodiment, the anchor bracket 32 includes a pair of axially and outwardly extending arms 34 and 36 which are interconnected at their inboard ends by an inner tie bar 38 and which are interconnected at their outboard ends by an outer tie bar 40. The arms 34 and 36 each have a pair of generally C-shaped channels formed thereon (only the channels for the arm 36 being shown in FIG. 1 at reference number 36C). The channels are provided to slidably support an inboard brake shoe, indicated generally at 40, and an outboard brake shoe, indicated generally at 42, thereon. Alternatively, the construction and/or configuration of the anchor bracket 32 may be other than illustrated and described if so desired.

In the illustrated embodiment, the inboard brake shoe 40 includes a backing plate 44 and a friction pad 46. The inboard backing plate 44 includes opposed ends having tabs or protrusions 44A formed thereon, for supporting the inboard brake shoe 40 in the channels of the anchor bracket 32. The outboard brake shoe 42 includes a backing plate 48 and a friction pad 50. The outboard backing plate 48 includes opposed ends having tabs or protrusions 48A formed thereon, for supporting the outboard brake shoe 32 in the channels of the anchor bracket 32. Alternatively, the construction and/or supporting of one or both of the brake shoes 40 and 42 may be other than illustrated and described if so desired. For example, the inboard brake shoe 40 can be supported on a brake piston/pistons 52 of the disc brake assembly 10, and/or the outboard brake shoe 42 can be supported on the outboard leg portion 24 of the caliper 20.

In the illustrated embodiment, an actuation means (not shown) is provided for effecting the operation of the disc brake assembly 10. In the illustrated embodiment, the actuation means includes the pair of brake pistons 52 each of which is disposed in a counterbore or recess (not shown), formed in an outboard surface of the inboard leg 22 of the caliper 20. The actuation means can be hydraulic, electrical, pneumatic, and mechanical types.

As shown in FIG. 1, each of the guide pins 12, which will be discussed below in detail, is disposed in a non-threaded bore 54 (shown in FIG. 4), provided in each of the arms 34 and 36 of the anchor bracket 32. A boot seal 56 is preferably installed in each of the openings 54 through which each of the guide pins 12 extend. A pair of threaded fasteners 58 are provided to slidably secure the caliper 20 to the anchor bracket 32. The fasteners 58 extend through openings 60A provided in lugs or ears 60 of the caliper 20 and are installed in an internally threaded bore 62 (shown in FIG. 1), provided in each guide pin 12.

Turning now to FIGS. 2-3, the construction of the first embodiment of the guide pin 12 will be discussed in detail. In the illustrated embodiment, each of the guide pins 12 is preferably identical to one another and includes a first end, indicated generally at 70, which defines a head portion. The guide pin 12 further includes a second end, indicated generally at 72, which defines a lead-in portion, and a center section, indicated generally at 74, which defines a shank portion. In the illustrated embodiment, the shank portion 74 defines an outer diameter 74OD of the guide pin 12 which is less than an inner diameter 54ID (shown in FIG. 4), of the bore 54.

In the illustrated embodiment, the head 70 preferably includes the internally threaded bore 62 (shown in FIG. 1), provided therein. The head 70 is illustrated as being a hexagon shaped head and preferably further includes a flange 76. The flange 76 preferably includes an indicia or other suitable identifying feature 76A (shown in FIG. 1), provided therein or thereon so that the orientation of the guide pin 12 in the bore 54 of the caliper 12 can be set to a desired predetermined orientation therewithin. In the illustrated embodiment, the indicia 76A is a V-shaped notch provided in the flange 76. Alternatively, the construction and/or configuration of the head 70 may be other than illustrated and described if so desired. For example, the head 70 would not have the internally threaded bore if stud type guide pins are used.

In the illustrated embodiment, the shank portion 74 of the guide pin 12 is annular, defines a first axis Y and a second axis X (both shown in FIG. 4), and preferably includes an annular groove, indicated generally at 78, provided in a portion thereof. The groove 78 defines an axis X1 which is offset or eccentric relative to the axis X a distance D so as to define a groove first "high side" depth G1, which is shown at the upper hand portion of FIG. 2 and would be at an associated 12 O'clock position, and an opposite groove second "low side" depth G2, which would be opposite the first depth G1 and is shown at the lower hand portion of FIG. 2 and would be at an associated 6 O'clock position. As can be seen, the first depth G1 is greater than the second depth G2. In the illustrated embodiment, the distance D is preferably in the range from about 0.05 mm to about 0.8 mm. More preferably, the distance D is in the range from about 0.1 mm to about 0.4 mm.

In the illustrated embodiment, the groove 78 is configured to receive a "spring-like" or resilient annular bushing or member 84 therein (as best shown in FIG. 3). Preferably, the member 84 is formed from rubber and is a "non-handed" or "symmetric" member in that the configuration thereof is of the same pattern or shape in both the radial and axial directions. As shown in this embodiment, the member 84 is provided with six axially extending raised protuberances or ribs 84R (only four of such ribs 84R being shown in FIG. 3 and three of such ribs 84R being shown in FIG. 4).

As shown in FIG. 3, due to the offset distance D, when the member 84 is installed in the groove 78 of the guide pin 12, one or more first or "lower" portions 84A thereof will be disposed or extend radially outwardly past the outer diameter 74OD of the shank portion 74 of the guide pin 12 a distance D1, as shown on the bottom hand portion of FIG. 3. At the same time, in the illustrated embodiment one or more opposite second or "upper" portions 84B of the member 84 will be disposed or extend radially inwardly relative to the outer diameter 74OD of the shank portion 74 of the guide pin 12 a distance D2, as shown on the upper hand portion of FIG. 3.

Referring now to FIG. 4, there is illustrated a schematic view for discussion purposes generally taken in the direction of line 4-4 of FIG. 3, and also showing the guide pin 12, with the member 84 installed thereon, installed in the bore 54 of the anchor bracket 32 (shown in phantom), of the vehicle disc brake assembly 10. As shown therein, in the illustrated embodiment when the pin 12 having the member 84 installed thereon is disposed in the bore 54 of the anchor bracket 32, three ribs 84R of the first portion 84A of the member 84 will engage and be compressed against the inner diameter 54ID of the bore 54 causing the ribs 84 to be compressed from the uninstalled condition (e.g., shown in FIG. 3), to the compressed condition as shown in the lower hand portion of FIG. 4. As a result of this, the member 84 will bias or move the guide pin 12—in a spring-like manner—in an upward direction in FIG. 4 causing a metal to metal "defined" contact between a portion, indicated generally at 74A, of the shank portion 74 and the inner diameter 54ID of the bore 54, as shown in the upper hand portion of FIG. 4.

As used herein, the term "defined contact" or "defined point of contact" means a defined point, line or area of contact defined between the portion 74A of the shank portion 74 and a portion of the inner diameter 54ID of the bore 54. In the illustrated embodiment, the defined contact between the portion 74A and the bore 54 extends an angular distance C. The angular distance C is preferably in the range from about 1-2 degrees to about 88-89 degrees. More preferably, the range is from about 15 degrees to about 60 degrees. Even more preferably the range is from about 30 degrees to about 45 degrees.

Also, in the illustrated embodiment as shown in FIG. 4, due to the compression of the member 84 when it is installed in the bore 54, an axis X2 of the bore 54 is located between the axis X of the guide pin 12 and the axis X1 of the groove 78. In other words, the axis X2 of the bore 54 is offset (or eccentric) and substantially parallel relative to the axis X of the guide pin 12 and the axis X of the guide pin 12 is offset (or eccentric) and parallel relative to the axis X1 of the groove 78.

Also, as can be seen in FIG. 4, the member 84 is operative to provide a first or "radial" guide pin clearance D3 between the inner diameter 54ID of the bore 54 and the outer diameter 74OD of the shank portion 74 of the guide pin 12. The clearance D3 is preferably in the range from about 0.10 mm to about 0.30 mm.

Alternatively, the construction of the guide pin 12 and/or associated parts of the disc brake assembly 10 may be other than illustrated and described if so desired. For example, the configuration, number, location and/or orientation of one or more of the first end 70, the second end 72, the shank portion 74, the groove 78, the member 84, the angle A and/or the distances D and/or D1 may be other than illustrated and described, if so desired.

For example, the member 84 may be formed from other materials so long as the material is operative to provide a spring-like or similar biasing feature to that of the rubber material. Also, more than one member 84 can be provided in one or more grooves 78 and/or more than one defined points of contact can be provided between the associated surfaces of the guide pin and the bore. Furthermore, the member 84 may different from that which is illustrated and described and may be of other types or kinds of construction and/or configuration, such as for example, a "simple" cylinder. Thus, as can be readily understood, there are many different configurations possible having at least one or more of such members and one or more of such defined points of contact C. Also, as can be readily understood, the present invention can be used in connection with other attachment styles of guide pins if so desired.

Figure 5:
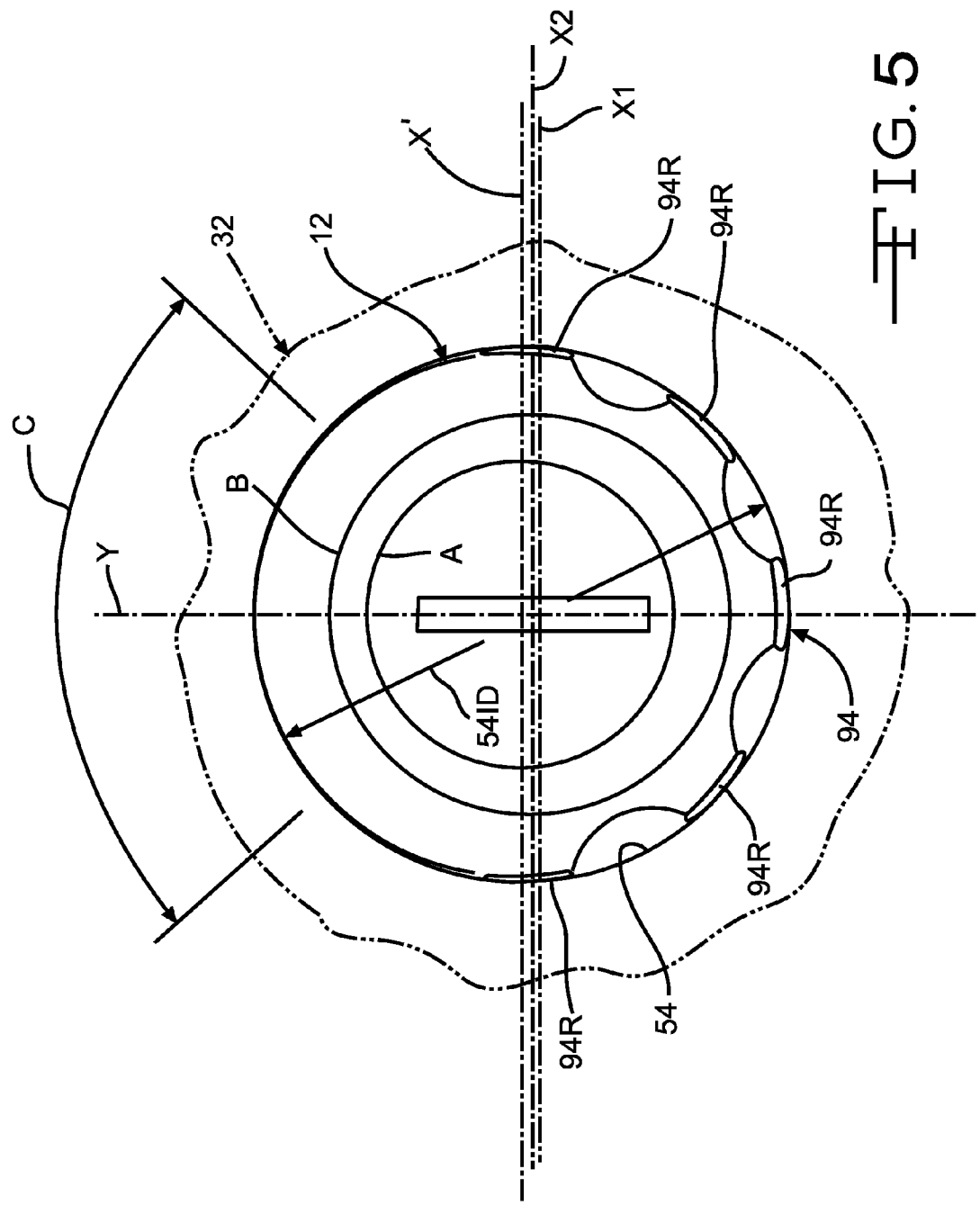
FIG. 5 is a schematic view for discussion purposes similar to FIG. 4 showing a second embodiment of a guide pin constructed in accordance with the present invention.

Turning now to FIG. 5 and using like reference numbers to indicate corresponding or similar parts, there is illustrated a second embodiment of a guide pin, illustrated generally at 12'. The embodiment shown in FIG. 5 is a schematic view for discussion purposes and is similar to that shown and described above in connection with the first embodiment of the guide pin 12, except that in this embodiment a member, only partially shown and indicated generally at 94, is provided having a different configuration or construction compared to that of the member 84 of the first guide pin embodiment. Thus, like in the first embodiment, in this second embodiment a similar groove (not shown) for receiving the member 94 is provided in a shank portion of the guide pin 12' and the groove has an axis X1 which is offset relative to an axis X' of the guide pin 12'.

As shown in this embodiment, the member 94 is provided with eight axially extending raised protuberances or ribs 94R (only five of such ribs 94R being shown in FIG. 5). As can be seen in this embodiment, due to the compression of some of the ribs 94R of the member 94 when it is installed in the bore 54 (in the illustrated embodiment five ribs 94R are at least partially compressed), an axis X2 of the bore 54 is located between an axis X' of the guide pin 12' and the axis X1 of the groove 78. In other words, the axis X2 of the bore 54 is offset relative to the axis X' of the guide pin 12'. Thus, it is understood that once the guide pin 12' of the second embodiment is installed in the bore 54, the function and operation of the guide pin 12' having the member 94 would be similar or the same as that of the guide pin 12 having the member 84 described and illustrated above in connection with the first embodiment.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A disc brake assembly comprising:
   an anchor bracket having at least one bore formed therein, the bore defining a first axis; and
   a guide pin adapted to be disposed in the at least one bore of the anchor bracket and configured to slidably support a brake caliper relative to the anchor bracket, the guide pin defining a second axis;
   wherein the guide pin includes at least one annular groove formed therein, the groove defining a third axis which is offset and substantially parallel relative to the second axis of the guide pin, the at least one groove having an annular resilient member disposed therein which member engages and is compressed against an inner surface of the at least one bore such that the member only is operative to continually bias the guide pin in the at least one bore whereby the second axis of the guide pin is continually offset and substantially parallel relative to the first axis of the at least one bore such that there is provided only by the member, due to the member engaging and being compressed against the inner diameter of the at least one bore, at least one defined point of contact between a portion of the guide pin and a portion of an inner surface of the at least one bore, wherein the first axis of the at least one bore is located between the second axis of the guide pin and the third axis of the groove.

2. The disc brake assembly of claim 1 wherein the member is an annular rubber bushing.

3. The disc brake assembly of claim 1 wherein the guide pin includes a first end, a shank portion and an opposite second end, wherein the groove is formed at least in the shank portion.

4. The disc brake assembly of claim 3 wherein the first end includes an indicia indicating means.

5. The disc brake assembly of claim 3 wherein the shank portion of the guide pin defines an outer diameter which is less than the inner diameter of the at least one bore.

6. The disc brake assembly of claim 3 wherein the at least one point of contact extends less than 180 degrees.

7. The disc brake assembly of claim 1 wherein the member includes a plurality of raised ribs, wherein at least one of the plurality of raised ribs engage a portion of the inner surface of the at least one bore and is compressed.

8. A disc brake assembly comprising:
   an anchor bracket having a bore formed therein, the bore defining a first axis; and
   a guide pin adapted to be disposed in the at least one bore of the anchor bracket and configured to slidably support a brake caliper relative to the anchor bracket, the guide pin defining a second axis;
   wherein the guide pin includes an annular groove formed therein, the groove defining a third axis which is eccentric and substantially parallel relative to the second axis of the guide pin, the groove having an annular resilient member disposed therein which member engages and is compressed against an inner surface of the at least one bore such that the member only is operative to continually bias the guide pin in the at least one bore whereby the second axis of the guide pin is continually eccentric and substantially parallel relative to the first axis of the at least one bore such that there is provided only by the member, due to the member engaging and being compressed against the inner diameter of the at least one bore, at least one defined point of contact between a portion of the guide pin and a portion of an inner surface of the at least one bore, wherein the first axis of the at least one bore is located between the second axis of the guide pin and the third axis of the groove.

9. The disc brake assembly of claim 8 wherein the member is an annular rubber bushing.

10. The disc brake assembly of claim 8 wherein the guide pin includes a first end, a shank portion and an opposite second end, wherein the groove is formed at least in the shank portion.

11. The disc brake assembly of claim 10 wherein the first end includes an indicia indicating means.

12. The disc brake assembly of claim 10 wherein the shank portion of the guide pin defines an outer diameter which is less than the inner diameter of the bore.

13. The disc brake assembly of claim 10 wherein the at least one point of contact extends less than 180 degrees.

14. The disc brake assembly of claim 1 wherein the member includes a plurality of raised ribs, wherein the plurality of raised ribs engage a portion of the inner diameter surface of the bore and are compressed.

15. A guide pin adapted for use in a disc brake assembly comprising:
    a guide pin defining a first axis and having an annular groove formed therein, the groove defining a second axis which is eccentric and substantially parallel relative to the first axis of the guide pin, the groove having an annular resilient member disposed therein which is configured to engage and be compressed against an inner surface of a bore provided in an anchor bracket of the disc brake assembly such that the member only is configured to continually bias the guide pin in the bore of an anchor bracket of the disc brake assembly whereby the first axis of the guide pin is continually eccentric and substantially parallel relative to a third axis of the bore such that there is provided only by the member, due to the member engaging and being compressed against the inner diameter of the bore, at least one defined point of contact between a portion of the guide pin and a portion of an inner surface of the bore.

16. The guide pin of claim 15 wherein the member is an annular rubber bushing, the guide pin includes a first end, a shank portion and an opposite second end, and the groove is formed at least in the shank portion.

* * * * *